United States Patent
Sharma et al.

(10) Patent No.: US 11,573,706 B2
(45) Date of Patent: Feb. 7, 2023

(54) DATA STORAGE DEVICE AND METHOD FOR EFFICIENT IMAGE SEARCHING

(71) Applicant: Western Digital Technologies, Inc., San Jose, CA (US)

(72) Inventors: Amit Sharma, Karnataka (IN); Dinesh Kumar Agarwal, Karnataka (IN); Abhinandan Venugopal, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/340,372

(22) Filed: Jun. 7, 2021

(65) Prior Publication Data
US 2022/0391100 A1 Dec. 8, 2022

(51) Int. Cl.
*G06F 3/06* (2006.01)
*G06F 16/53* (2019.01)

(52) U.S. Cl.
CPC .......... *G06F 3/0611* (2013.01); *G06F 3/0604* (2013.01); *G06F 3/0631* (2013.01); *G06F 3/0658* (2013.01); *G06F 3/0688* (2013.01); *G06F 16/53* (2019.01)

(58) Field of Classification Search
CPC ...... G06F 3/0611; G06F 3/064; G06F 3/0631; G06F 3/0658; G06F 3/0688
See application file for complete search history.

(56) References Cited

U.S. PATENT DOCUMENTS

| 5,119,444 | A | 6/1992 | Nishihara |
| 7,392,233 | B2 | 6/2008 | Tanaka |
| 8,254,697 | B2 | 8/2012 | Isard et al. |
| 9,411,830 | B2 | 8/2016 | Mei et al. |
| 9,916,538 | B2 | 3/2018 | Zadeh et al. |
| 10,593,085 | B2* | 3/2020 | Kemelmaher .......... G06F 16/51 |
| 10,794,710 | B1* | 10/2020 | Liu ........................ G06V 10/82 |
| 2010/0318515 | A1* | 12/2010 | Ramanathan ....... G06F 16/7847 707/723 |
| 2011/0244919 | A1* | 10/2011 | Aller ...................... G06Q 30/06 382/165 |

(Continued)

FOREIGN PATENT DOCUMENTS

WO WO 2021/027340 A1 2/2021

OTHER PUBLICATIONS

International Search Report dated May 12, 2022 for International Application No. PCT/US2022/012866.

(Continued)

*Primary Examiner* — Angelica Ruiz
(74) *Attorney, Agent, or Firm* — Crowell & Moring LLP

(57) ABSTRACT

A data storage device and method for efficient image searching are provided. In one embodiment, a data storage device is provided comprising a memory and a controller. The controller is configured to store a plurality of images and a plurality of keys in the memory, wherein each key of the plurality of keys is generated from a respective image of the plurality of images; receive, from a host, a key generated from a target image desired by the host; and return, to the host, an image from the stored plurality of images that is associated with a key that matches the key received from the host. Other embodiments are provided.

20 Claims, 15 Drawing Sheets

(56) References Cited

U.S. PATENT DOCUMENTS

2019/0317688 A1 10/2019 Cheon et al.
2021/0165589 A1 6/2021 Heo et al.

OTHER PUBLICATIONS

Written Opinion dated May 12, 2022 for International Application No. PCT/US2022/012866.
Search Strategy completed May 11, 2022 for International Application No. PCT/US2022/012866.
"Pyramid (image processing)"; Wikipedia entry; downloaded from the Internet at https://en.wikipedia.org/wiki/Pyramid_(image_processing) on Apr. 5, 2021; 5 pages.

* cited by examiner

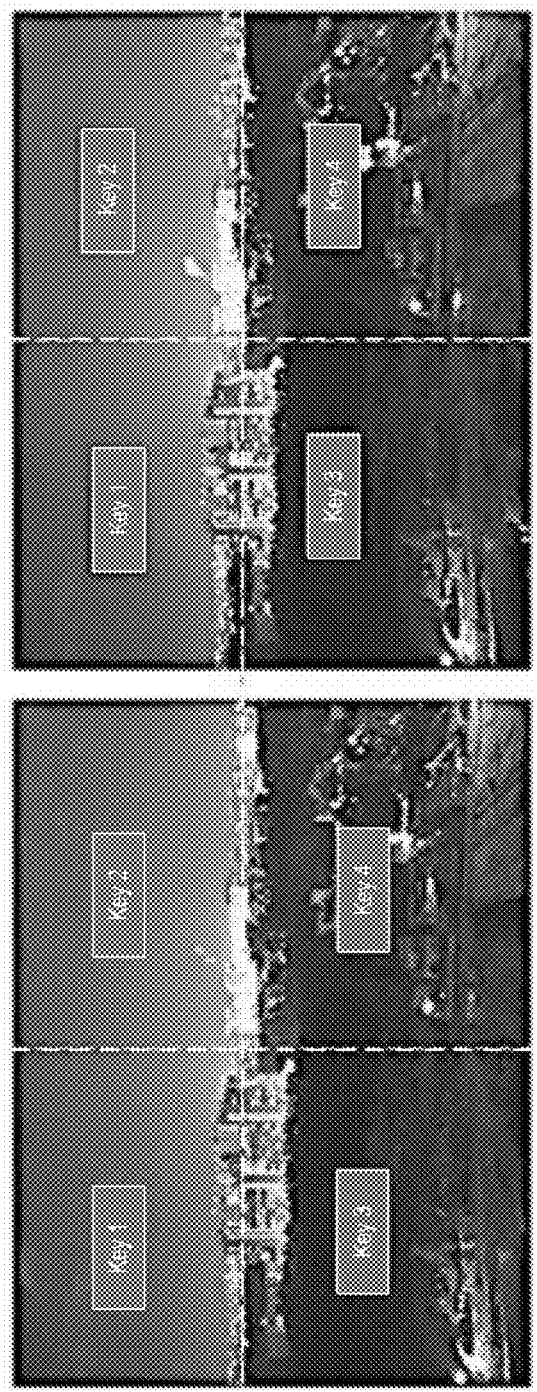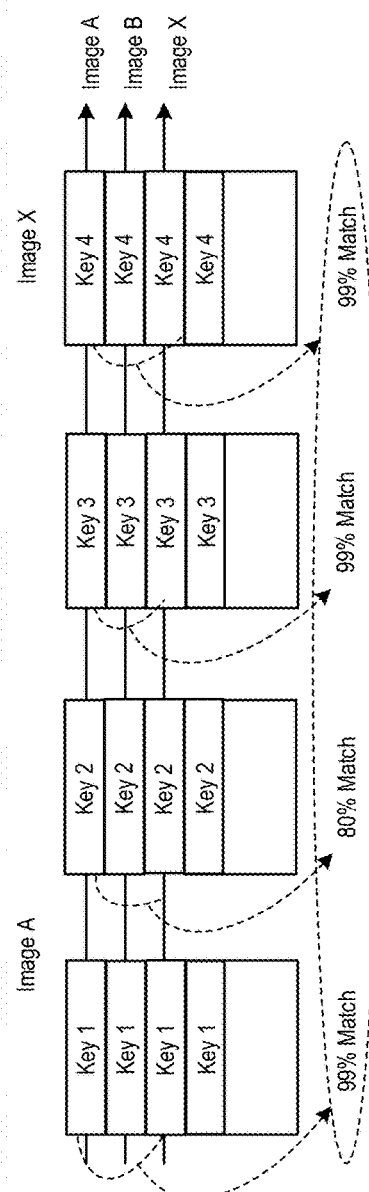
FIG. 14

DATA STORAGE DEVICE AND METHOD FOR EFFICIENT IMAGE SEARCHING

Background

A host can store data, such as images, in a memory of a data storage device. If the host wants to search the images for a target image, the host can retrieve the stored images from the memory of the data storage device and perform an image analysis operation on the retrieved images to identify the image that matches the target image.

BRIEF DESCRIPTION OF THE DRAWINGS

FIG. 14 is a block diagram illustrating a similar-image-matching operation of an embodiment.

DETAILED DESCRIPTION

Overview

Figure 1A:
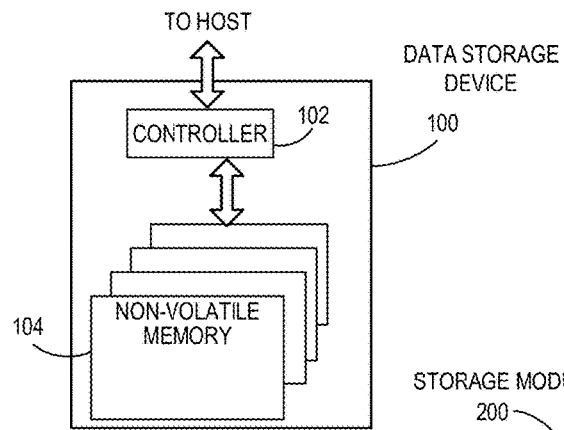
FIG. 1A is a block diagram of a data storage device of an embodiment.

By way of introduction, the below embodiments relate to a data storage device and method for efficient image searching. In one embodiment, a data storage device is provided comprising a memory and a controller. The controller is configured to store a plurality of images and a plurality of keys in the memory, wherein each key of the plurality of keys is generated from a respective image of the plurality of images; receive, from a host, a key generated from a target image desired by the host; and return, to the host, an image from the stored plurality of images that is associated with a key that matches the key received from the host.

In some embodiments, the plurality of keys is generated by the host.

In some embodiments, the controller is further configured to generate the plurality of keys.

In some embodiments, each key of the plurality of keys is generated by applying a Gaussian filter to a respective image of the plurality of images.

In some embodiments, the memory comprises a plurality of dies, and the controller is further configured to store the plurality of keys across the plurality of dies.

In some embodiments, an image of the plurality of images is associated with two or more keys and each of the two or more keys is stored in different dies of the plurality of dies.

In some embodiments, the plurality of dies is configured to perform parallel searching for the key that matches the key received from the host.

In some embodiments, the controller is further configured to determine a subset of the memory to search for the key that matches the key received from the host; and search only the determined subset of the memory for the key that matches the key received from the host.

In some embodiments, the plurality of images and the plurality of keys are stored in different blocks in the memory.

In some embodiments, the controller is further configured to determine which of the stored plurality of keys matches with each other prior to receiving the key from the host.

In some embodiments, the controller is further configured to perform the determining as a background operation.

In some embodiments, a key size is less than or equal to a size of a processing unit of a memory die.

In some embodiments, a key size is larger than a size of a processing unit of a memory die.

In some embodiments, the controller is further configured to provide the size of the processing unit to the host.

In some embodiments, the memory comprises a three-dimensional memory.

In another embodiment, a method is provided that is performed in a host in communication with a data storage device. The method comprises: generating a key for a target image to be retrieved from the data storage device; sending the key for the target image to the data storage device; and receiving, from the data storage device, an image from a plurality of images stored in the data storage device that is associated with a key that matches the key for the target image.

In some embodiments, the key is generated by applying a Gaussian filter to the target image.

In some embodiments, the method further comprises receiving, from the data storage device, a maximum size of the key.

In some embodiments, the method further comprises generating a plurality of keys for the plurality of images; and sending the plurality of keys and the plurality of images for storage in the data storage device.

In some embodiments, at least one of the plurality of images is associated with a plurality of keys.

In another embodiment, a data storage device is provided comprising: a memory; means for storing a plurality of images and a plurality of keys in the memory, wherein each key of the plurality of keys is generated from a respective image of the plurality of images; means for receiving, from a host, a key generated from a target image desired by the host; and means for returning, to the host, an image from the stored plurality of images that is associated with a key that matches the key received from the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
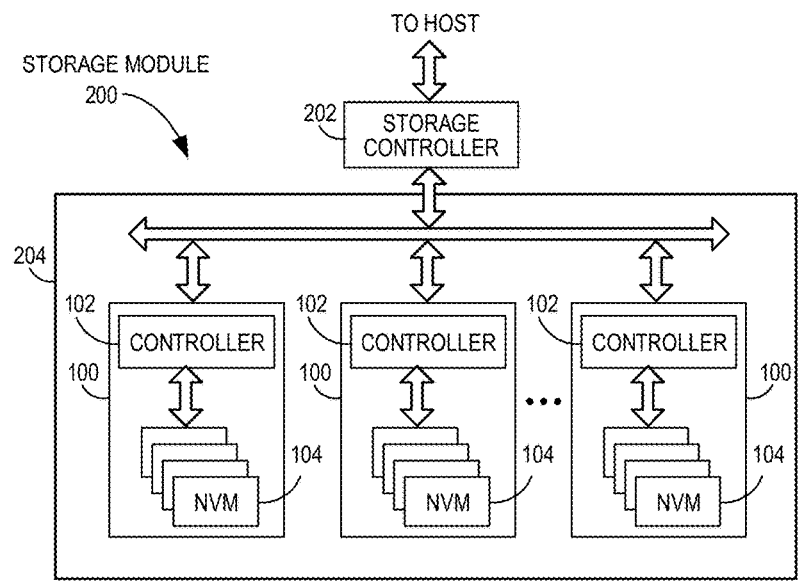
FIG. 1B is a block diagram illustrating a storage module of an embodiment.
Figure 1C:
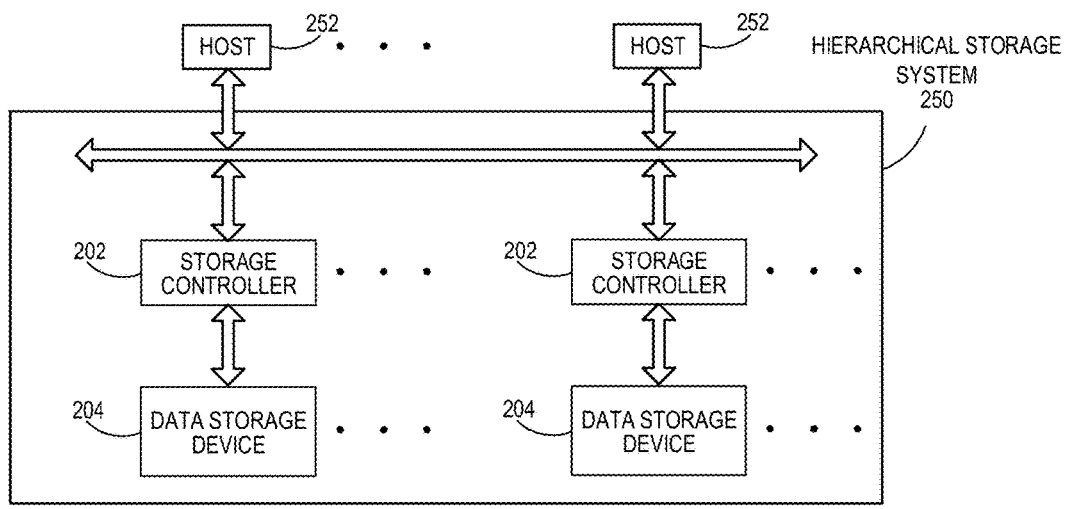
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
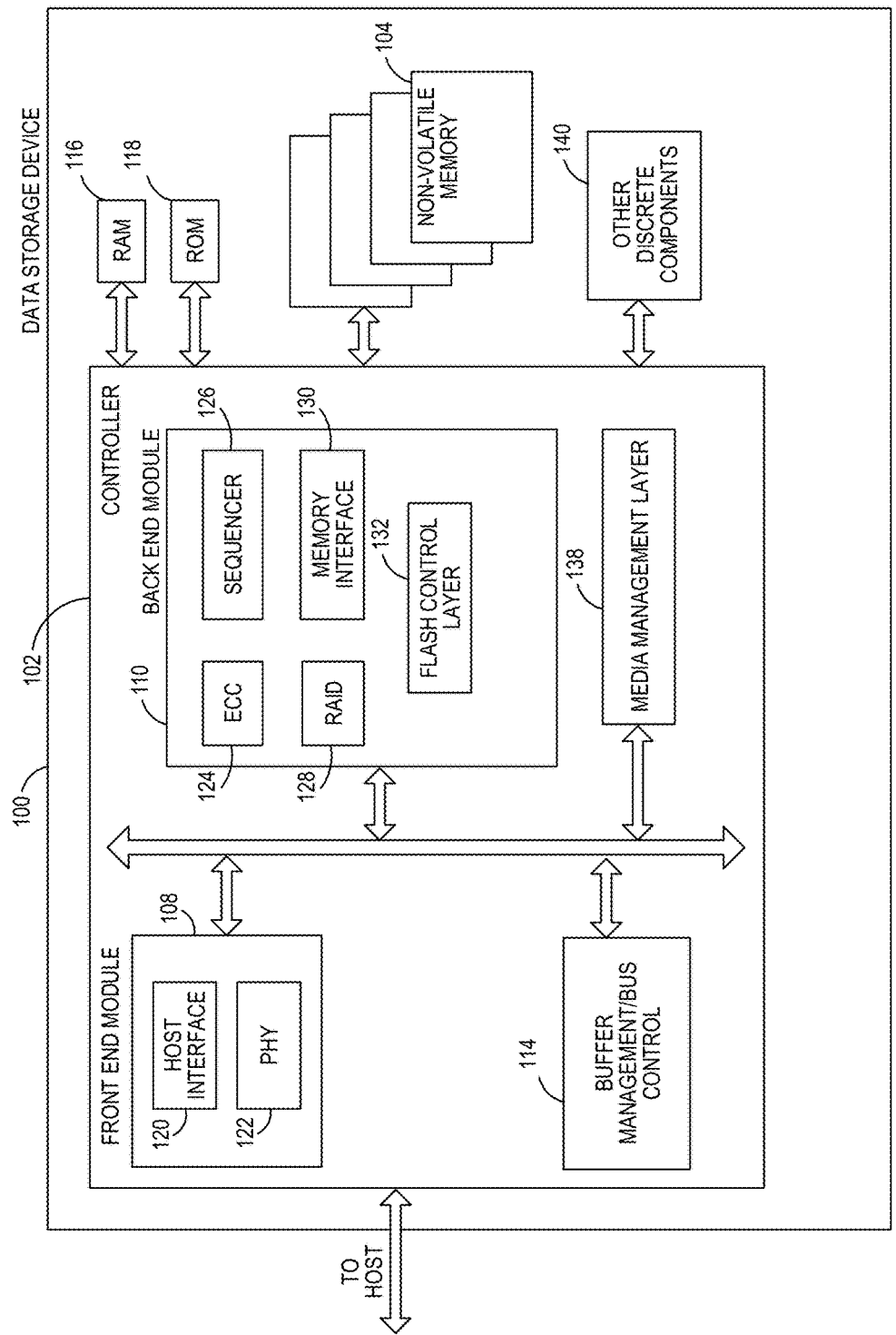
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
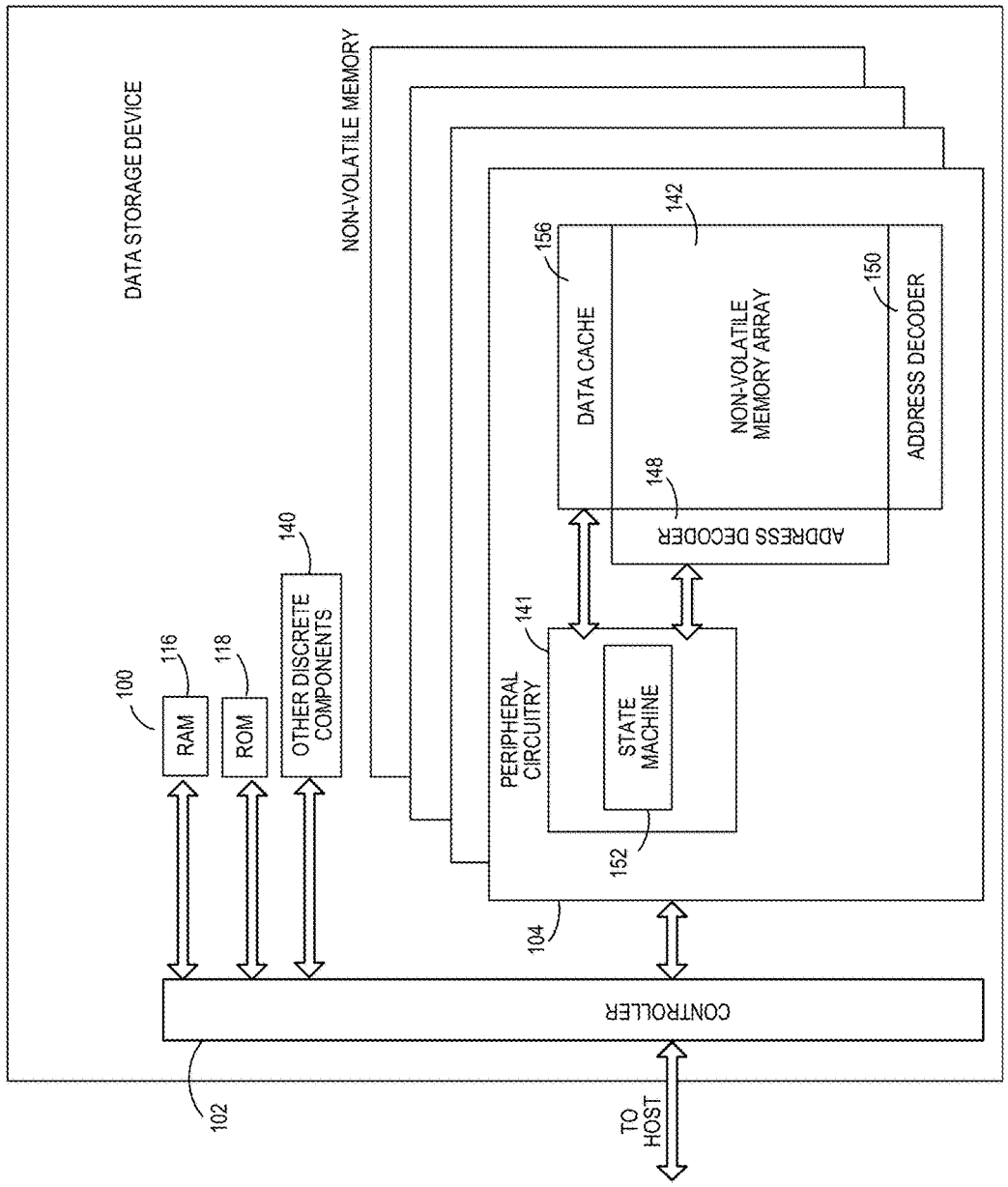
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
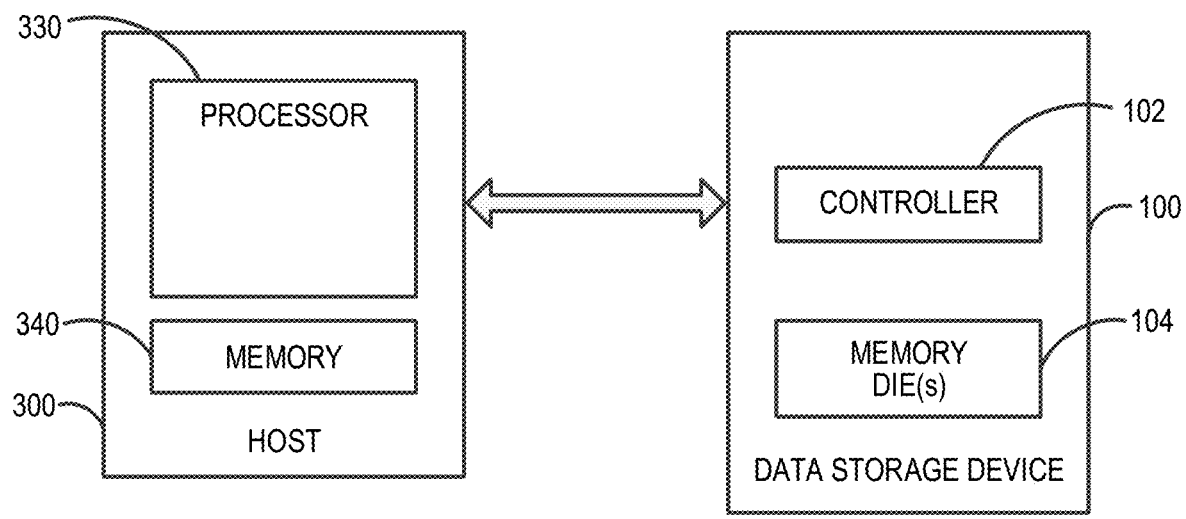
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Figure 4:
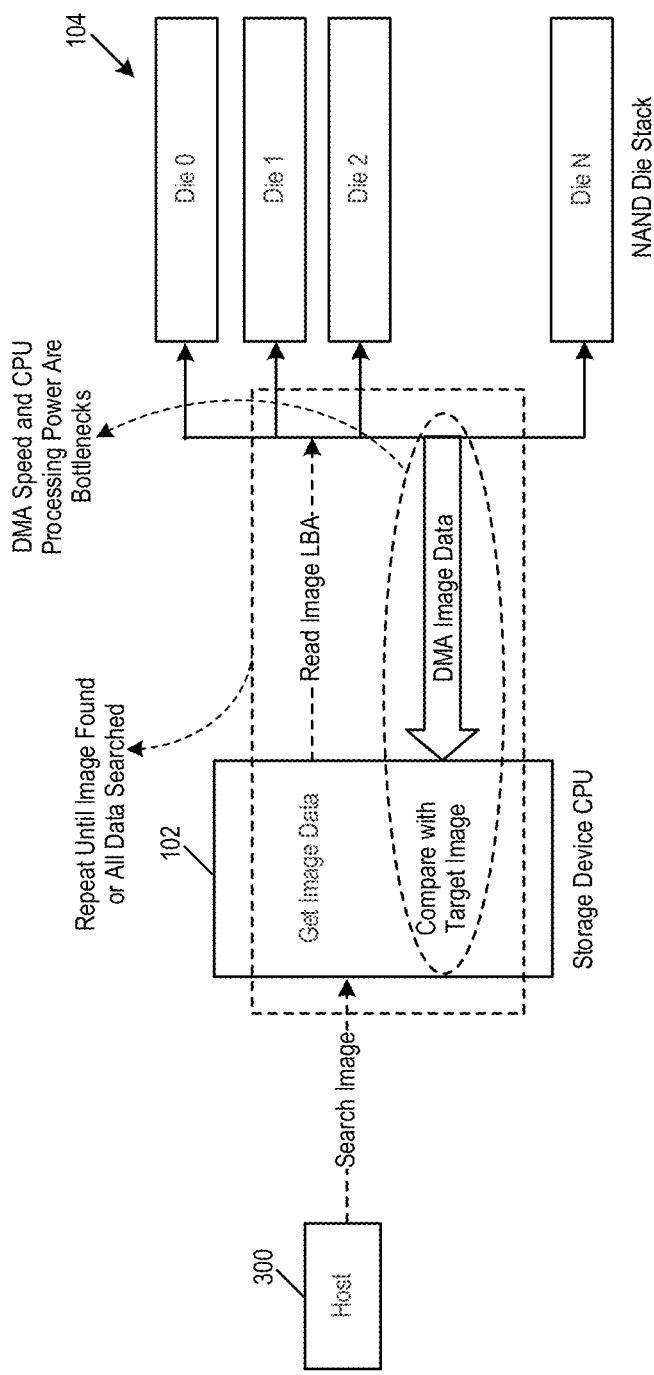
FIG. 4 is a block diagram illustrating a storage computing environment of an embodiment.

As discussed above, the host 300 can store data, such as images, in the memory 104 of the data storage device 100. If the host 300 wants to search the images for a target image, the host 300 can retrieve the stored images from the memory 104 of the data storage device 100 and perform an image analysis operation on the retrieved images to identify the image that matches the target image. However, since the data storage device 100 has a controller/processor 102, the data storage device 100 (sometimes referred to herein as a computational storage device) can perform computations and send back the result to the host 300. Computational storage has the advantage of less data movement on the input-output bus with the host 300. So, instead of sending the images back to the host 300 for analysis, the controller 102 in the data storage device 100 can be used to search the images for a target image. This process is illustrated in FIG. 4. As shown in FIG. 4, the host 300 sends a target image to the data storage device 100, and the controller 102 in the data storage device 100 fetches a stored image and compares it to the target image, with this process continuing until the entire database of images stored in the memory 104 is searched. Once an image matching the target image is found, the controller 102 sends the matching image to the host 300.

In this process, direct memory access (DMA) speed and processing power are the bottlenecks, as the controller 102 of the data storage device 100 is primality designed for basic command processing. To address this issue, a data storage device manufacture can add more processing capabilities and increase the internal DMA speed, but that would add to the cost.

The following embodiments provide a way to address this issue that avoids adding cost to the data storage device 100. In general, with these embodiments, at least one key is generated (e.g., by the host 300 or the data storage device 100) for each image to be stored in the memory 104 of the data storage device 100. When the host 300 wants to search for a target image, instead of sending the target image to the data storage device 100, the host 300 sends a key generated from the target image. That way, the data storage device 100 only needs to search for a stored key that matches the target key instead of doing a search on the entire image. As used here, a "match" can refer to an exact match or a match within a certain degree or matching granularity (e.g., 90% match, best match, etc.). Also, the target image can be a subset of what is shown in a stored image (e.g., where the target image is a license plate or a face, and the stored image contains other objects or scenery).

Because the key is much smaller than the image, key searching is much faster and less computationally-intensive than full-image searching. Various optimizations can be used. For example, if the keys are stored across multiple dies of the memory 104, the multiple dies can be searched in parallel. Also, as a background operation prior to receiving the key for the target image, the controller 102 can identify approximately-similar images (based on stored keys). That way, if one of the keys is later identified in a search for a target key, the approximately-similar images can be provided quickly.

The following paragraphs provide several example implementations of these embodiments. It should be noted that these are merely examples, and details of these examples should not be read into the claims unless expressly recited therein.

Figure 5:
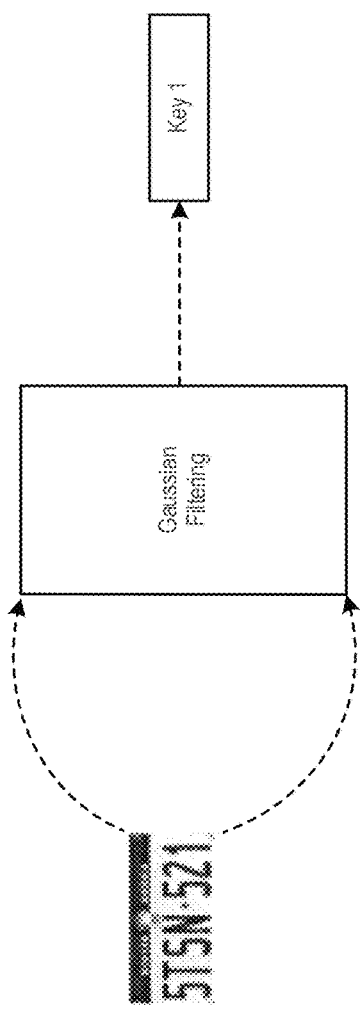
FIG. 5 is a block diagram illustrating generating a unique key for small images of an embodiment.
Figure 6:
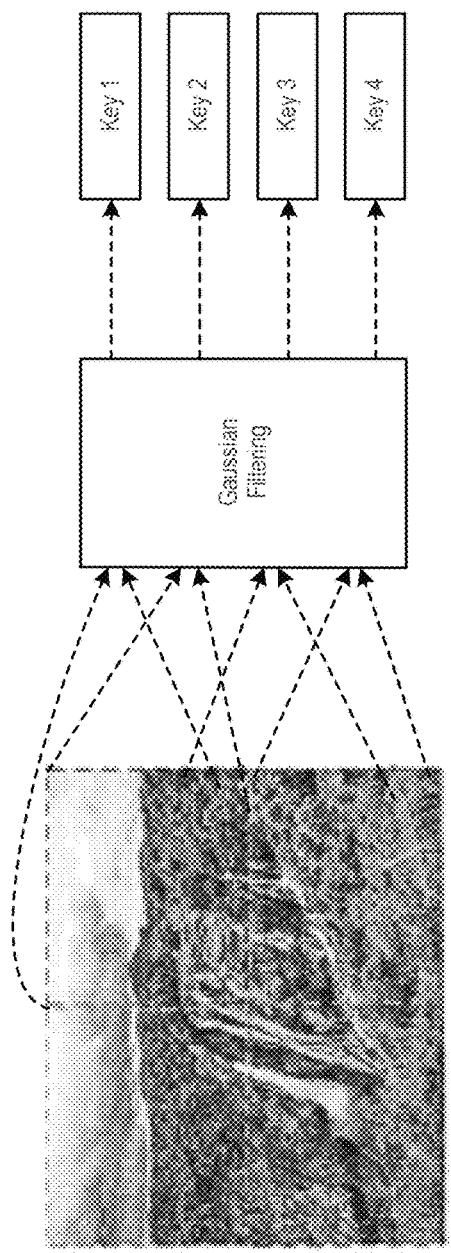
FIG. 6 is a block diagram illustrating generating keys for a large image of an embodiment.

As mentioned above, in one embodiment, the controller 102 of the data storage device 100 store a plurality of images and a plurality of keys in the memory, wherein each key of the plurality of keys is generated from and is associated with a respective image of the plurality of images. While a key can be generated from an image using any suitable technique, in one embodiment (shown in FIG. 5), the key is generated by applying a Gaussian filter to the image. While FIG. 5 shown a single key being generated from a single image, as shown in FIG. 6, multiple keys can be generated from a single image. The use of one key or multiple keys can be determined based on the size of the image. For example, the image in FIG. 6 is divided into several sub-images, with each sub-image getting its own key. For simplicity, several of the examples below will be discussed in terms of a single key per image; however, it should be understood that multiple keys per image can be used and are complemented in the claims that recite "a key." Also, a key can be generated by the host 300 and sent along with the image to the data storage device 100 for storage, or the controller 102 in the data storage device 100 can generate a key based on an image received from the host 300. Also, the host that sends the image for storage in the data storage device 100 may or may not be the same as the host that requests a search for a target image.

The controller 102 can store the images and their associated keys in the memory 102 in any suitable fashion. In one embodiment, the memory 104 comprises a plurality of dies, and the controller 102 stores the plurality of images and keys across the plurality of dies. In this way, the plurality of dies can be searched in parallel for a match to the key received from the host 300 associated with a target image. Also, when an image is associated with multiple keys, such keys can be stored in different memory dies. An image and key can be associated in any suitable fashion (e.g., via a table, specific storage locations, metadata, etc.).

As noted above, in one embodiment, the searching of the memory 104 for a key associated with a target image can be done by the controller 102. In another embodiment, a memory die has circuitry to search keys stored in that memory die. For example, a NAND memory die can have some computational capability (e.g., XOR circuitry or a complementary metal-oxide-semiconductor (CMOS) under the memory array (CUA)). However, due to cost, a memory die may have very limited NAND processing power and limited RAM (e.g., tens of kilobytes (KBs)) available inside a CUA NAND die. For example, a memory die may only be able to process 64 KBs of data at a time, which is equal to the NAND latch die size in one embodiment. These limitations prevent a memory die from searching for an image, where a typical image size may be in the range in tens of megabytes (MB) and NAND dies are capable of processing only tens of KB of data.

Figure 7:
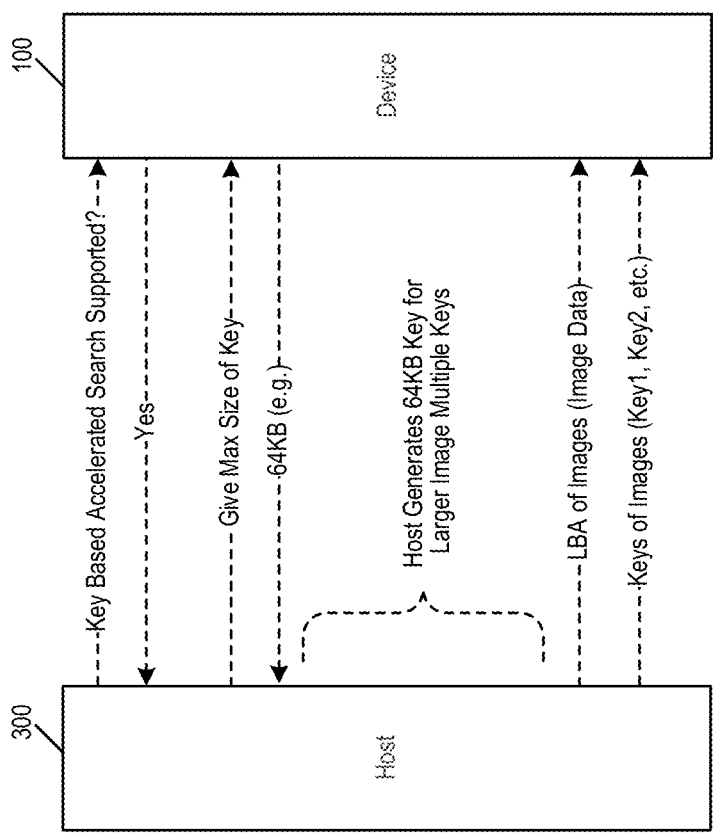
FIG. 7 is a block diagram illustrating an accelerated image search host-device handshake of an embodiment.

However, as noted above, in this embodiment, instead of searching for an image, the data storage device 100 can search for a key generated from the image, where the key is small enough (e.g., less than 64 KB) to fit into a processing unit in a memory die, so the memory die would be able to search for the key. (Again, as mentioned above, instead of the memory die doing the searching, the searching can be done by the controller 102.) So, in one embodiment, the unique key associated with an image is less than or equal to the size of a processing unit in the memory die (e.g., 64 KB). The host 300 and data storage device 100 can communicate with each other to understand the key-based image search capabilities and the maximize size of a key. FIG. 7 illustrates this accelerated image search, host-device handshake.

As shown in FIG. 7, the host 300 first asks the data storage device 100 if it supports a key-based accelerated search. If the data storage device 100 responds in the affirmative, the host 300 then requests the maximum key size from the data storage device 100. In this example, the maximum key size is 64 KB, which is the size of the processing unit of the memory dies. (Key size in some other implementations can be bigger than processing size of a die.) Next, the host 300 generates a 64 KB key for an image (or multiple keys, e.g., if the image is a large image) and sends the logical block addresses (LBAs) of the images to be stored and the keys to the data storage device 100.

When the data storage device 100 receives the images and keys from the host 300, the data storage device 100 stores the images and keys in the memory 104 in any suitable way. For example, the controller 102 of the data storage device 100 can store the keys alongside the image data across the plurality of dies of the memory 104. In doing so, the controller 102 can ensure that each unique key of an image is stored in different dies. All the keys of a multi-key image can be searched in parallel, as each die has its own computation capabilities. The controller 102 can also maintain information about where keys are stored within the memory 104 and use this information to determine a subset of the memory 104 (e.g., which memory dies) to search for the key that matches the key received from the host 300 in an image search query. In other words, instead of each memory die in the memory 104 performing a search, only the memory dies that store the relevant keys would be activated for searching. In this way, instead of searching the entire capacity of the memory 104 for a target key, only a smaller memory area is searched. One way to do this is to store keys in separate blocks in the memory 104 (e.g., in a key database), which is illustrated in FIG. 8.

Figure 8:
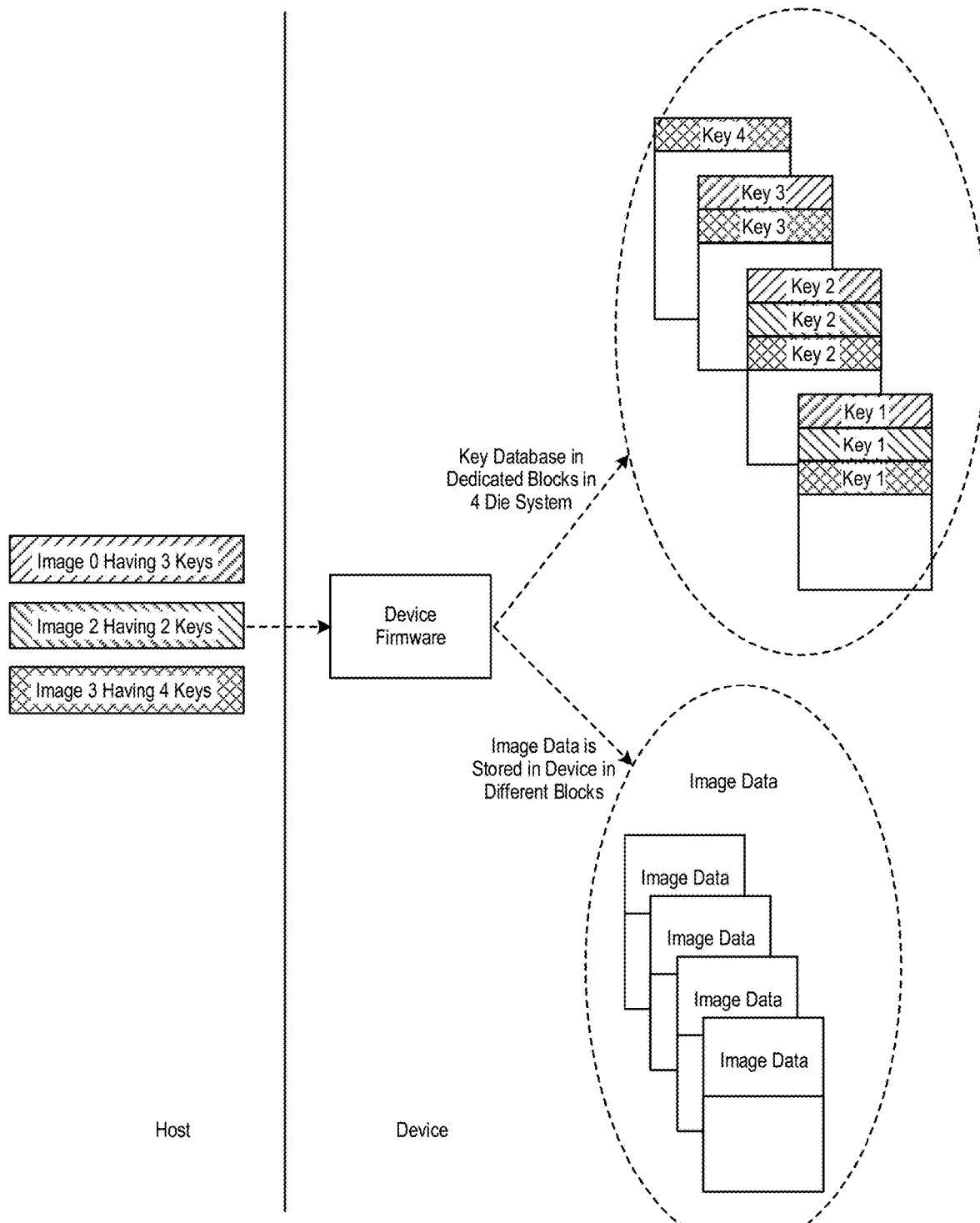
FIG. 8 is a block diagram illustrating how a data storage device of an embodiment stores keys in dedicated blocks in memory.
Figure 9:
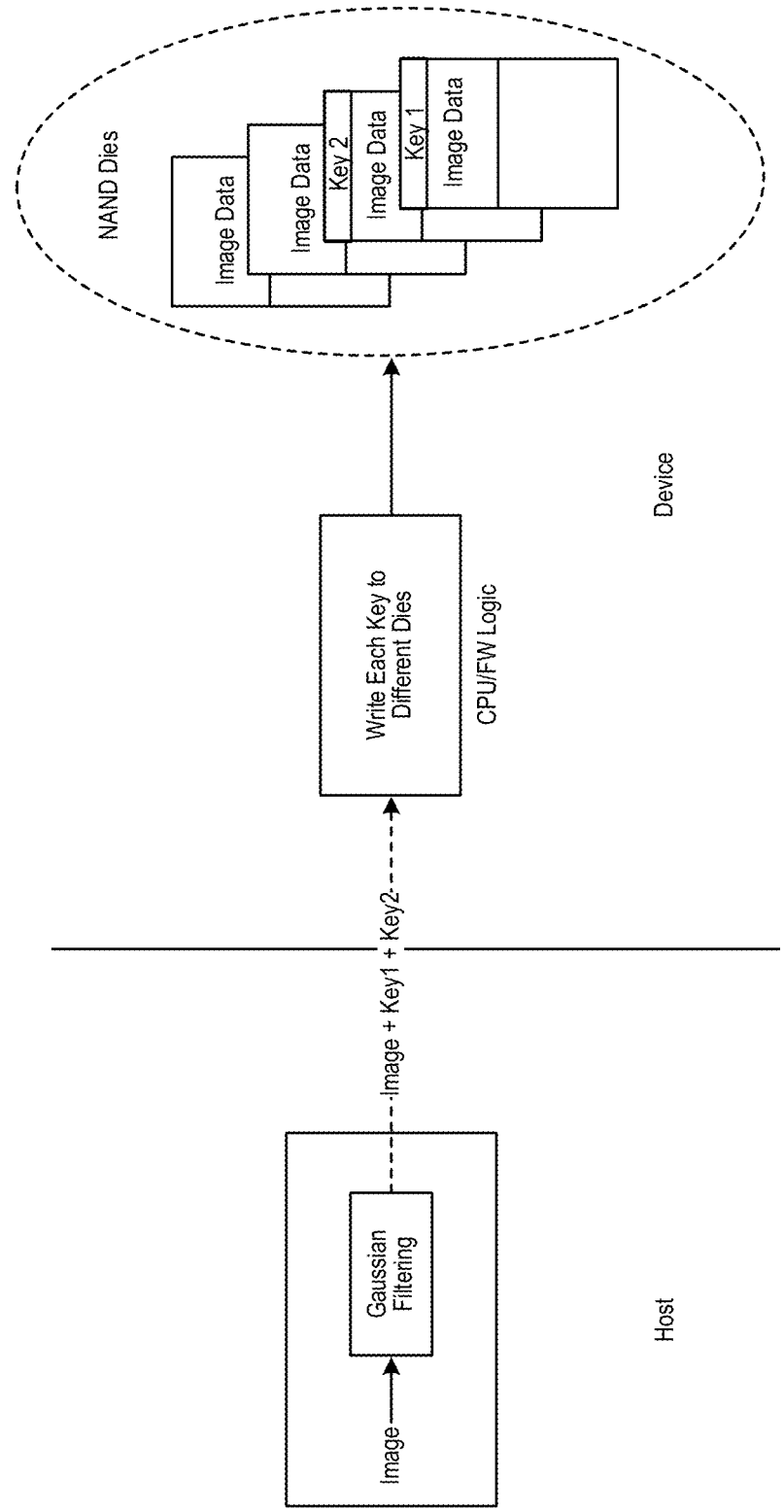
FIG. 9 is a block diagram illustrating a write flow method of an embodiment.

As shown in FIG. 8, in this example, the host 300 provides the data storage device 100 with three images, each with a different number of keys. The controller 102 (e.g., the device firmware) stores the keys in key databases in dedicated blocks across four memory dies. As indicated in the drawing, keys for a given image are stored in different memory dies, and the controller 102 also stores the image data in different blocks in the memory 104. In this example, Key 1 of all three images is stored in the same die/block. Here, that same block is Die 0, but Key 1 does not always need to go to Die 0, as the controller 102 can manage data structures to track the keys. In another example (illustrated in FIG. 9), keys are stored in different dies but alongside image data, where the location of the keys is maintained by the controller 102 (e.g., using a logical-to-physical address map).

As noted above, in this embodiment, instead of searching the stored images for a target image, the data storage device 100 searches the stored keys for a key of the target image. The host 300 (or data storage device 100) can use the Gaussian filter used previously to generate the key for the target image and then pass the key (or multiple keys) to the data storage device 100. In this example, the key to be searched is small enough for the NAND dies to operate on without the help of the controller 102. As such, a parallel key search can be triggered on multiple dies. If all the keys of an image fit a match criteria (e.g., 100% or some other percentage), the image has a hit, and the controller 102 retrieves the related image data and sends it to the host 300.

Figure 10:
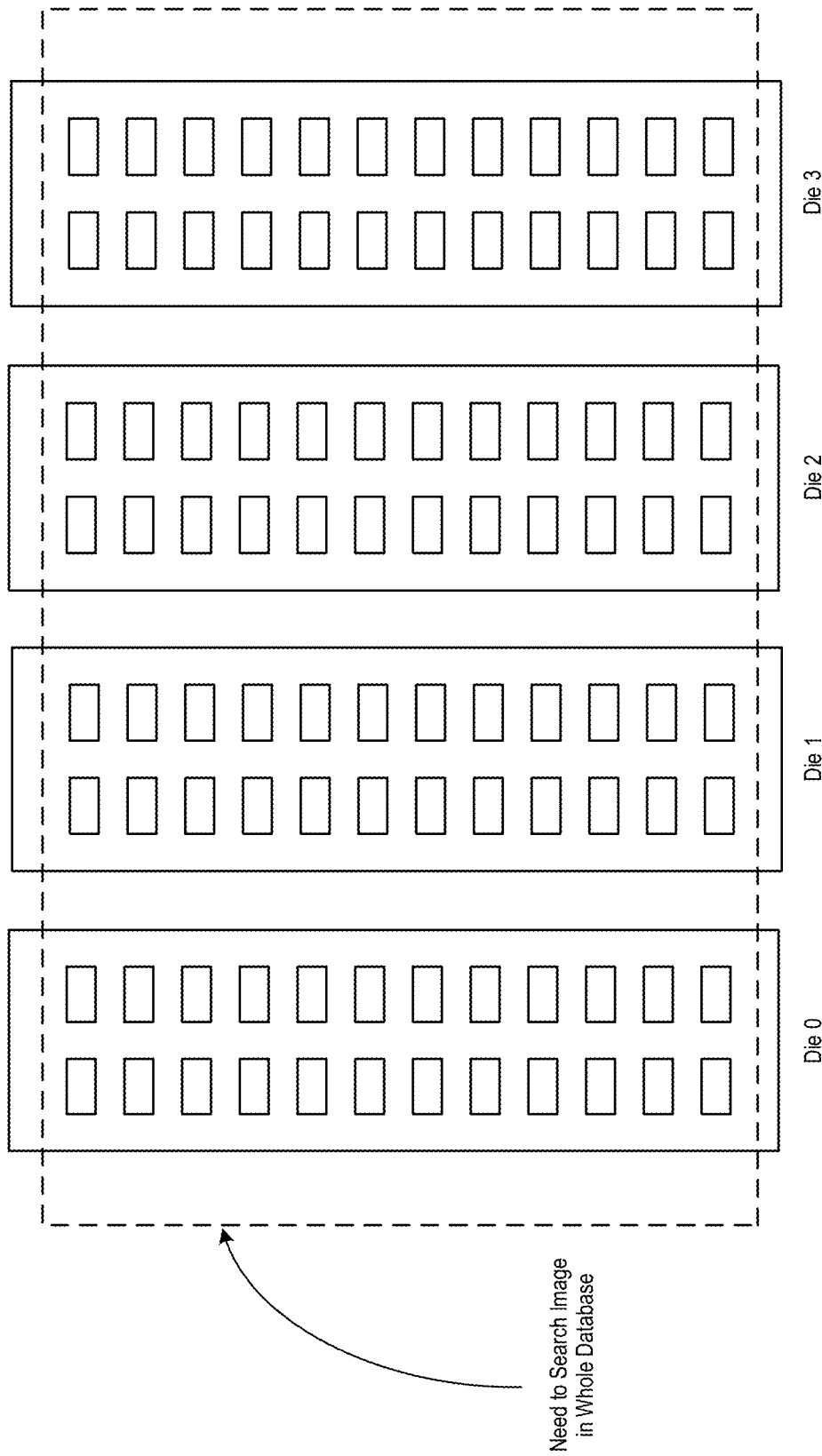
FIG. 10 is a block diagram illustrating an image search operation of an embodiment in which an entire memory is searched.
Figure 11:
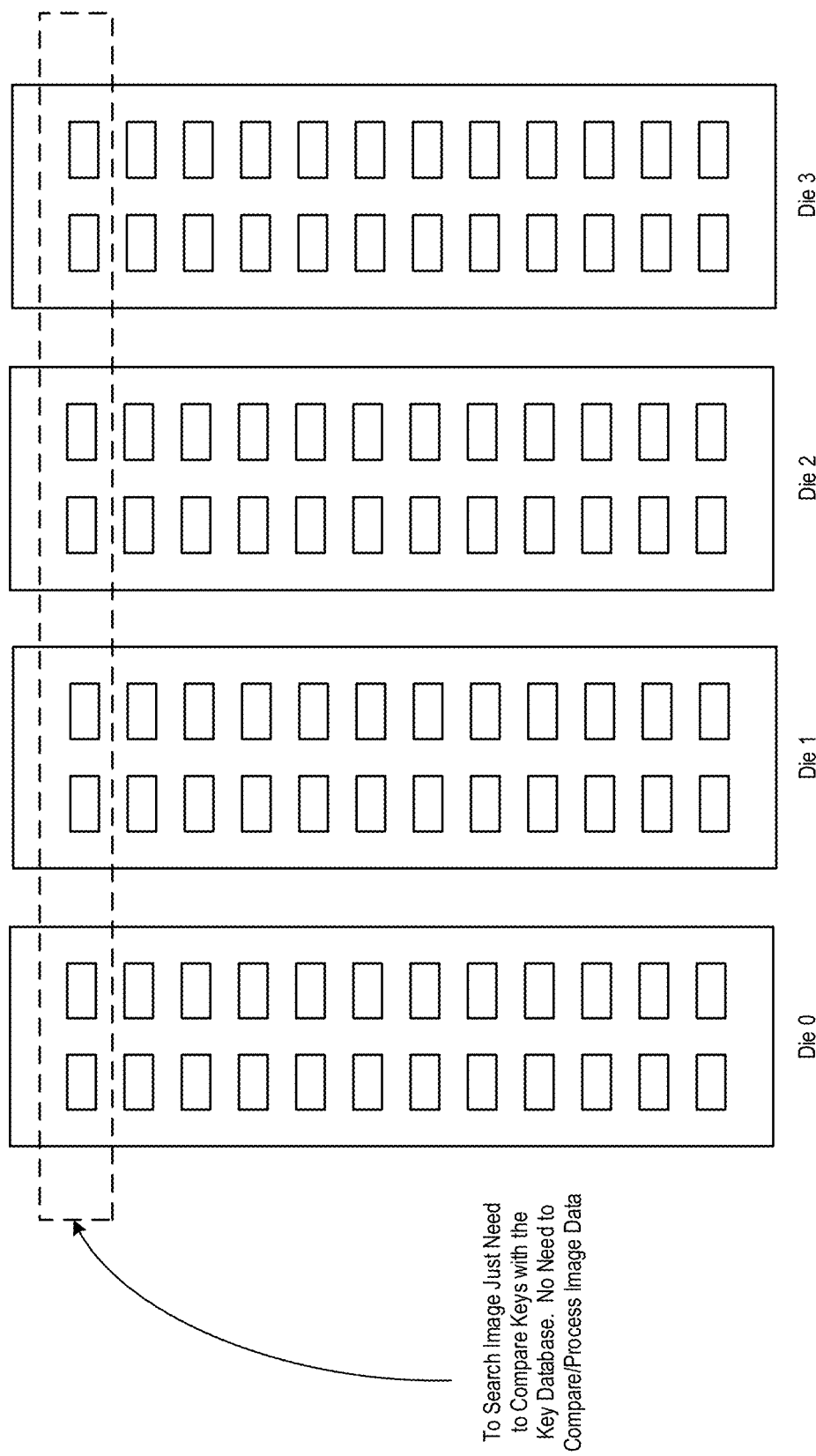
FIG. 11 is a block diagram illustrating an image search operation of an embodiment in which a subset of a memory is searched.

As shown in FIG. 10, in one embodiment, each memory die searches the entirety of its storage capacity for a matching key. However, as shown in FIG. 11, in another embodiment where each memory die maintains a key database, each die memory die just needs to search its key database, which is typically just a few blocks, instead of searching the entire memory die. Also, as mentioned above, each memory die can perform its searching in parallel with the searching performed by the other memory dies.

Figure 12:
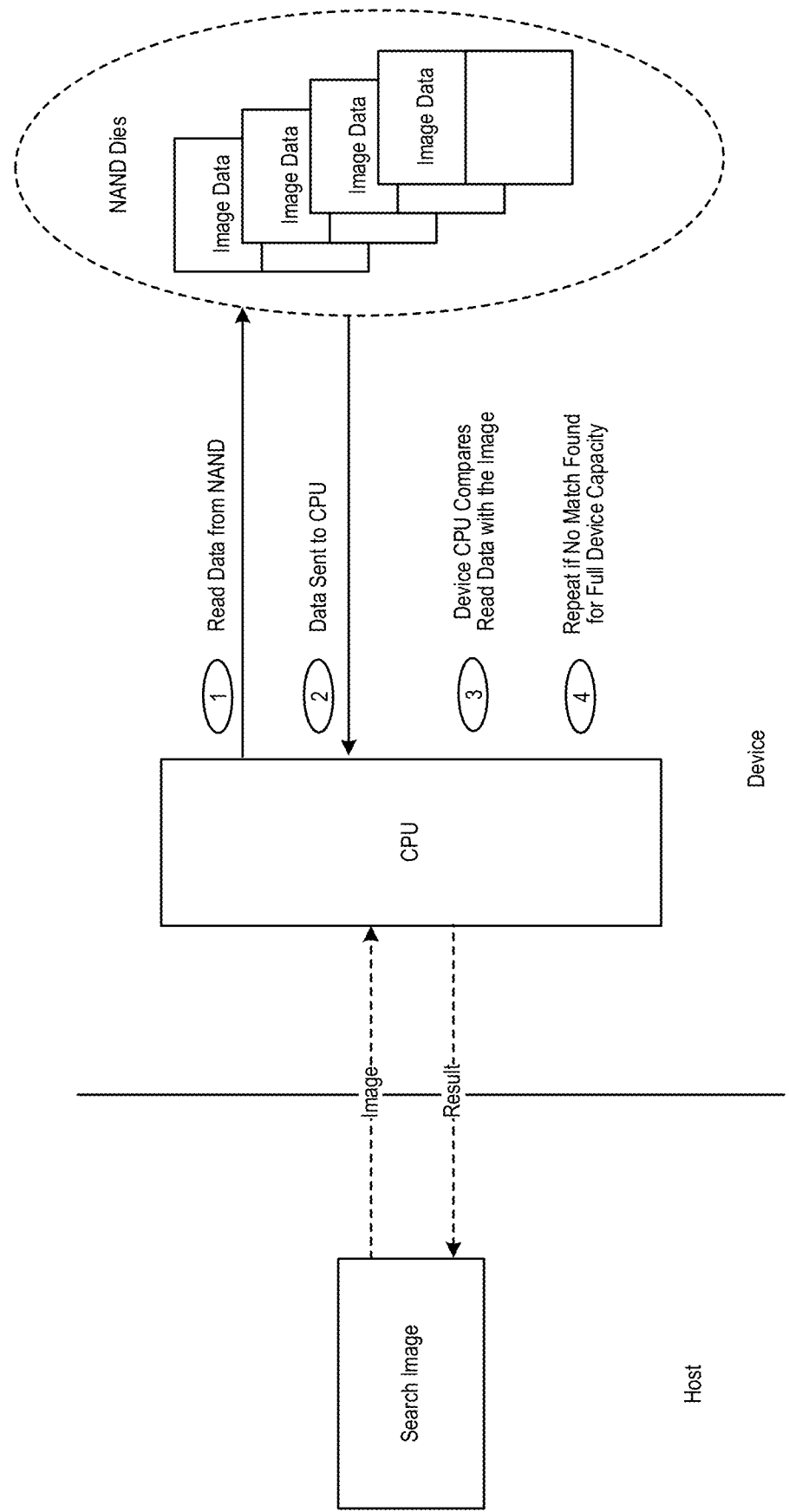
FIG. 12 is a block diagram illustrating a method of an embodiment for searching for an image.
Figure 13:
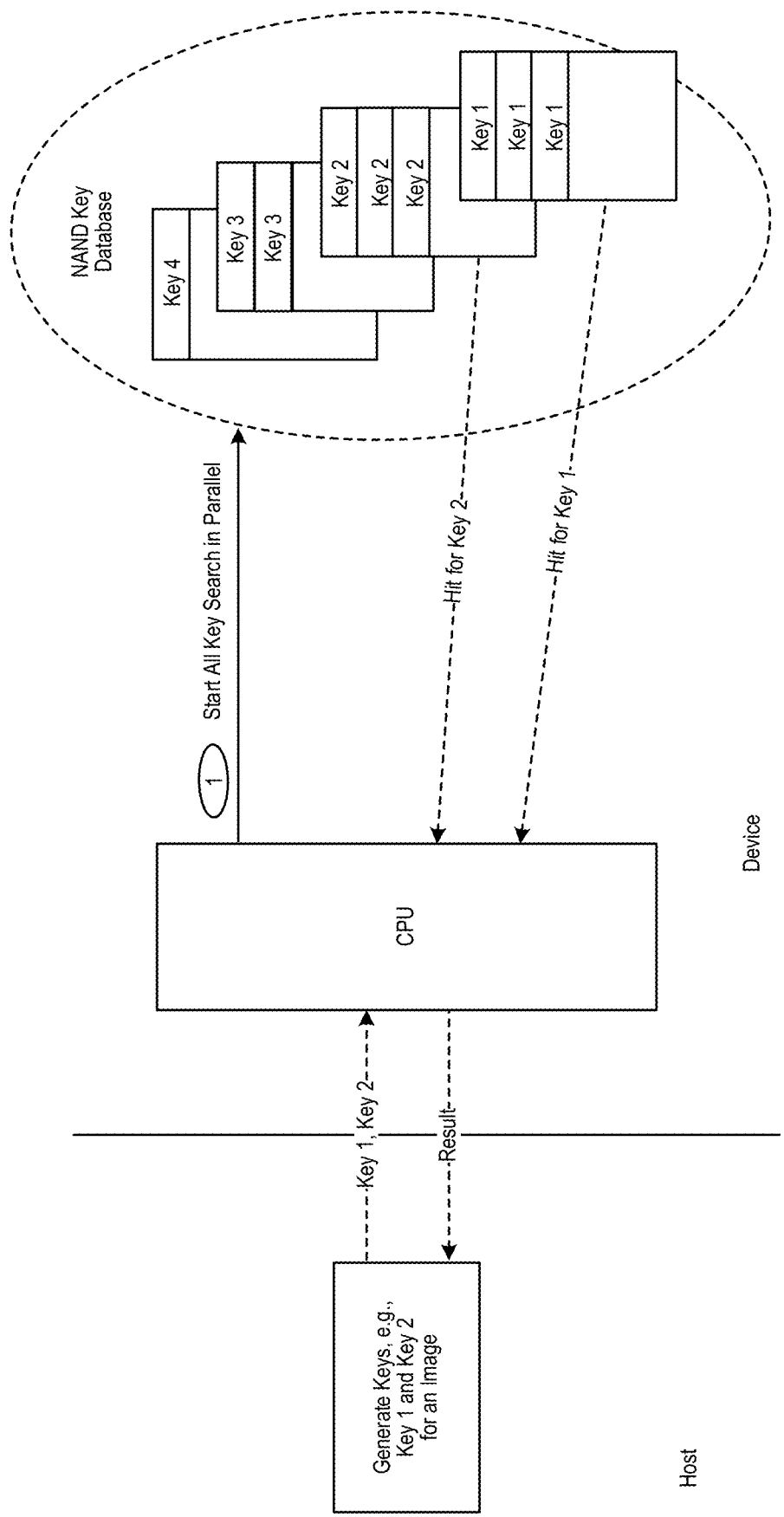
FIG. 13 is a block diagram illustrating a parallel search method of an embodiment.
Figure 15:
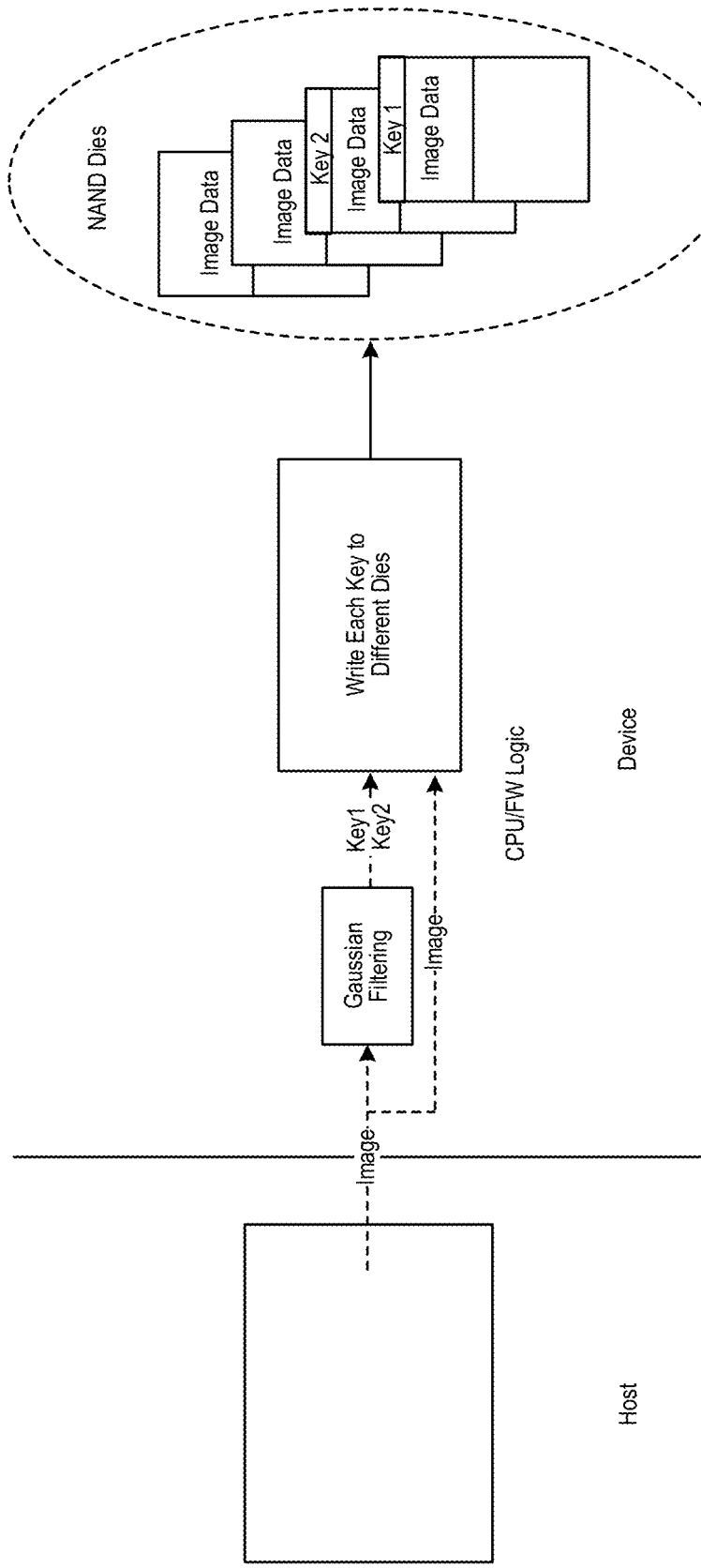
FIG. 15 is a block diagram illustrating a data storage device of embodiment that generates a key.

So, in this example, the controller 102 (e.g., central processing unit (CPU)) merely triggers the key search, with each die doing a search for the target key in its own key database. Each die informs the controller 102 of a hit or miss, and the controller 102 gathers the related image data from the die(s) that indicate a hit. This is illustrated in FIG. 13. This is much more efficient that the process in which the controller 102 receives the actual target image from the host 300 and compares that target image to stored images in the entirety of the memory 104, as illustrated in FIG. 12. The approach in FIG. 13 frees up the controller 102 for other processing.

In another embodiment, which is illustrated in FIG. 14, the data storage device 100 can search through all the keys stored in the memory 104 and create a list of keys that match (exactly or approximately) with each other. This process can be performed in the background (e.g., during device idle time). In this way, whenever the host 300 asks for an image search, the data storage device 100 can send the matches very quickly because the data storage device 100 already knows the matching keys. Once one key is found, all other related matching key information would be known.

As mentioned above, in yet another embodiment, the key generation can be part of the data storage device 100. However, key generation at the host 300 may be preferred. For example, if image processing requires special digital signal processing (DSP) engines or powerful CPUs and having image filtering capability in the data storage device 100 would increase the device's cost or power requirement beyond a desirable level, it may be desired to generate the key with a host 300 that already has DSP engines and powerful CPUs available (e.g., to encode images).

There are many advantages associated with these embodiments. For example, these embodiments can be used to accelerate the image search multifold without providing the data storage device 100 with additional DSP or processing power. Additionally, these embodiments can reduce the power requirement of the data storage device 100 as it does not need image processing. Further, the amount of data sensed from the memory 104 can be reduced (hence, less power consumption). Also, the data storage device 100 can have a precomputed matching key to accelerate the image search for similar images.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a controller configured to:
store a plurality of images and a plurality of keys in the memory, wherein each image is associated with a respective set of keys of the plurality of keys;
receive, from a host, a key generated from a target image desired by the host; and
return, to the host, an image from the stored plurality of images that is associated with a key of the plurality of keys that matches the key received from the host
wherein for each image of the plurality of images:
a number of keys that is in the set of keys associated with the image is based on a size of the image;
the image comprises a plurality of sub-images: and.
each key of the set of keys associated with the image is generated from a respective sub-image of the image.

2. The data storage device of claim 1, wherein the plurality of keys is generated by the host.

3. The data storage device of claim 1, wherein the controller is further configured to generate the plurality of keys.

4. The data storage device of claim 1, wherein each key of the plurality of keys is generated using a Gaussian filter.

5. The data storage device of claim 1, wherein:
the memory comprises a plurality of dies; and the controller is further configured to store the plurality of keys across the plurality of dies.

6. The data storage device of claim 5, wherein a set of keys associated with an image is stored in different dies of the plurality of dies.

7. The data storage device of claim 5, wherein the plurality of dies is configured to perform parallel searching for the key of the plurality of keys that matches the key received from the host.

8. The data storage device of claim 1, wherein the controller is further configured to:
    determine a subset of the memory to search for the key of the plurality of keys that matches the key received from the host; and
    search only the determined subset of the memory for the key of the plurality of keys that matches the key received from the host.

9. The data storage device of claim 1, wherein the plurality of images and the plurality of keys are stored in different blocks in the memory.

10. The data storage device of claim 1, wherein the controller is further configured to determine which of the stored plurality of keys matches with each other prior to receiving the key from the host.

11. The data storage device of claim 10, wherein the controller is further configured to perform the determining as a background operation.

12. The data storage device of claim 1, wherein a key size is less than or equal to a size of a processing unit of a memory die.

13. The data storage device of claim 1, wherein a key size is larger than a size of a processing unit of a memory die.

14. The data storage device of claim 1, wherein the memory comprises a three-dimensional memory.

15. A method comprising:
    performing the following in a host in communication with a data storage device that stores a plurality of images and a plurality of keys, wherein each image is associated with a respective set of keys of the plurality of keys:
        generating a key for a target image to be retrieved from the data storage device;
        sending the key for the target image to the data storage device; and
        receiving, from the data storage device, an image from the plurality of images that is associated with a key of the plurality of keys that matches the key for the target image;
    wherein for each image of the plurality of images:
        a number of keys that is in the set of keys associated with the image is based on a size of the image;
        the image comprises a plurality of sub-images: and.
        each key of the set of keys associated with the image is generated from a respective sub-image of the image.

16. The method of claim 15, wherein the key for the target image is generated by using a Gaussian filter.

17. The method of claim 15, further comprising receiving, from the data storage device, a maximum size of the key for the target image.

18. The method of claim 15, further comprising:
    generating the plurality of keys for the plurality of images; and
    sending the plurality of keys and the plurality of images for storage in the data storage device.

19. The method of claim 17, wherein the maximum size is less than or equal to a size of a processing unit of a memory die in the data storage device.

20. A data storage device comprising:
    a memory;
    means for storing a plurality of images and a plurality of keys in the memory, wherein each image is associated with a respective set of keys of the plurality of keys;
    means for receiving, from a host, a key generated from a target image desired by the host; and
    means for returning, to the host, an image from the stored plurality of images that is associated with a key of the plurality of keys that matches the key received from the host;
    wherein for each image of the plurality of images:
    a number of keys that is in the set of keys associated with the image is based on a size of the image
    the image comprises a plurality of sub-images and
    each key of the set of keys associated with the image is generated from a respective sub-image of the image.

* * * * *